United States Patent [19]

Raue et al.

[11] Patent Number: 4,513,142

[45] Date of Patent: Apr. 23, 1985

[54] PREPARATION OF CATIONIC METHINE DYESTUFFS

[75] Inventors: Roderich Raue; Volker Hühne; Hans-Peter Kühlthau, all of Leverkusen, Fed. Rep. of Germany

[73] Assignee: Bayer Aktiengesellschaft, Leverkusen, Fed. Rep. of Germany

[21] Appl. No.: 412,644

[22] Filed: Aug. 30, 1982

[30] Foreign Application Priority Data

Sep. 15, 1981 [DE] Fed. Rep. of Germany ....... 3136583

[51] Int. Cl.$^3$ .......................................... C09B 23/00
[52] U.S. Cl. .................... 548/507; 548/455; 548/490; 548/494; 548/427; 548/504
[58] Field of Search ............ 548/506, 507, 455, 427, 548/490, 494, 504; 542/456, 457

[56] References Cited

U.S. PATENT DOCUMENTS

| | | | |
|---|---|---|---|
| 1,524,791 | 2/1925 | Konig | 548/455 |
| 2,126,852 | 8/1938 | Wolff et al. | 548/217 |
| 2,179,895 | 11/1929 | Muller et al. | 260/465 |
| 2,280,253 | 4/1942 | Muller et al. | 542/457 |
| 2,385,747 | 9/1945 | Freyberg et al. | 542/457 |
| 2,974,141 | 3/1961 | Plue | 542/456 |
| 3,514,453 | 5/1970 | Spatz et al. | 548/455 |
| 3,786,047 | 1/1974 | Kuhlthau | 548/494 X |
| 3,812,108 | 5/1974 | Brack et al. | 548/494 X |
| 3,916,069 | 10/1975 | Tiers et al. | 542/456 |
| 3,925,015 | 12/1975 | Kuhlthau | 8/168 |
| 3,980,430 | 9/1976 | Kuhlthau | 8/168 R |
| 4,042,322 | 8/1977 | Kuhlthau | 8/168 R |

FOREIGN PATENT DOCUMENTS 837655 7/1976 Belgium .

*Primary Examiner*—Glennon H. Hollrah
*Assistant Examiner*—D. B. Springer
*Attorney, Agent, or Firm*—Sprung Horn Kramer & Woods

[57] ABSTRACT

A method of preparation of cationic dyestuffs having the formula

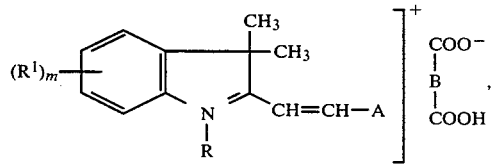

wherein A, B, R, and R$^1$ are defined in the specification carried out in the substantial absence of solvent and removing water formed in the reaction.

6 Claims, No Drawings

PREPARATION OF CATIONIC METHINE DYESTUFFS

The invention relates to new salts of cationic methine dyestuffs and to processes for their preparation and their use for dyeing/colouring natural and synthetic substrates. The new dye salts correspond to the general formula

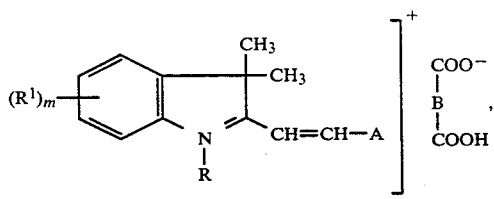

in which

R represents an alkyl radical having 1 to 4 C atoms and which is optionally substituted by hydroxyl, alkoxy having 1 to 4 C atoms, acyloxy, halogen, cyano, carboxyl, $C_1$- to $C_4$-carbalkoxy, carboxamido or acetyl, $R^1$ represents hydrogen, an alkyl radical having 1 to 4 C atoms, halogen, alkoxy having 1 to 4 C atoms, hydroxyalkoxy having 2-4 C atoms, a phenyl radical which is optionally substituted by halogen, $C_1$-$C_4$-alkyl or $C_1$-$C_4$-alkoxy, benzyloxy, benzyl, carboxyl, an alkyl carboxylate having 1 to 4 C atoms, a carboxamide group optionally substituted by 1 or 2 $C_1$ to $C_4$-alkyl radicals, a sulphonamide group optionally substituted by 1 or 2 $C_1$- to $C_4$-alkyl radicals, alkylsulphonyl having 1 to 4 C atoms, phenylsulphonyl or a cyano, trifluoromethyl, acetyl or benzoyl group, and A represents a radical of the formula

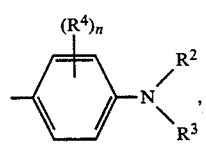

in which $R^2$ and $R^3$ independently of one another represent an alkyl radical having 1 to 4 C atoms and which is optionally substituted by hydroxyl, $C_1$- to $C_4$-alkoxy, halogen, cyano, phenyl, carbalkoxy having 1 to 4 C atoms, carboxamide, acyloxy, benzyloxy, sulphonamido or acylamino, $R^2$ additionally also represents a phenyl or benzyl radical which is optionally substituted by halogen, $C_1$-$C_4$-alkyl or $C_1$- to $C_4$-alkoxy or $R^2$, together with the adjacent C atom of the benzene ring, can form a partially hydrogenated N- and, if appropriate, O-containing 5- or 6-ring, and $R^4$ denotes hydrogen, an alkyl radical having 1 to 4 C atoms, an alkoxy radical having 1 to 4 C atoms or halogen, or a radical of the formula

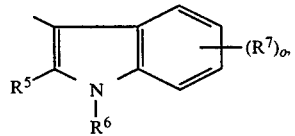

in which $R^5$ denotes an alkyl radical having 1 to 4 C atoms, a phenyl radical optionally substituted by halogen, $C_1$- to $C_4$-alkyl or $C_1$- to $C_4$-alkyloxy or a carbalkoxy radical having 1 to 4 C atoms, $R^6$ denotes H or an alkyl radical having 1 to 4 C atoms and which is optionally substituted by hydroxyl, halogen, alkoxy having 1 to 4 C atoms, cyano or acyloxy and $R^7$ denotes hydrogen, halogen, $C_1$- to $C_4$-alkyl, $C_1$- to $C_4$-alkoxy, carbalkoxy having 1 to 4 C atoms, $C_1$- to $C_4$-alkylsulphonyl, phenylsulphonyl, acetyl or benzoyl or a radical of the formula

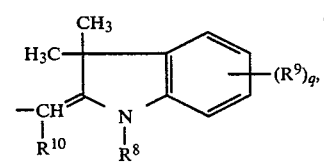

in which $R^8$ and $R^9$ independently of one another have the same meaning as in the formula I in which $R^{10}$ represents hydrogen or the cyano group, in which the radical B represents a single bond or a $C_1$- or $C_4$-alkylene radical which is substituted by hydroxyl radicals and optionally substituted by one additional carboxyl group and in which the indices m, n, o and p independently of one another denote 1 to 4.

A preferable group of the new dyestuffs corresponds to the general formula

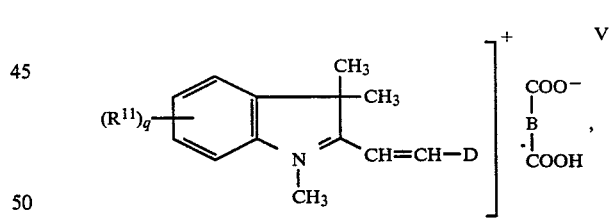

in which $R^{11}$ represents hydrogen, chlorine, methyl, methoxy, ethoxy or carbomethoxy, D represents a radical of the formula

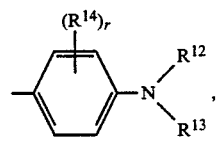

wherein $R^{12}$ and $R^{13}$ independently of one another designate an alkyl radical having 1 to 4 C atoms and which is optionally substituted by hydroxyl, methoxy, ethoxy, chlorine, cyano, phenyl or acyloxy and $R^{12}$ additionally designates a phenyl radical substituted by chlorine, methyl, methoxy or ethoxy and
$R^{14}$ designates hydrogen, methyl, chlorine, methoxy or ethoxy
or a radical of the formula

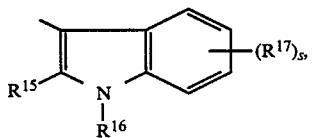

VII in which
$R^{15}$ denotes methyl or phenyl which is optionally substituted by chlorine, methyl or methoxy,
$R^{16}$ denotes a $C_1$- to $C_4$-alkyl radical which is optionally substituted by hydroxyl, chlorine, cyano or acyloxy or H and
$R^{17}$ denotes hydrogen, methyl, methoxy or ethoxy or a radical of the formula

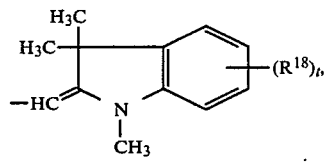

VIII in which $R^{18}$ independently of one another has the same meaning as $R^{11}$ in the formula V and in which the radical B has the same meaning as in the formula I and the indices q, r, s, and t represent 1 to 2.

Acyl is preferably understood as meaning acetyl, propionyl, benzoyl and carbamoyl.

Of these dyestuff salts those are in turn preferable in which B represents a single bond, the anion thus representing the radical of oxalic acid.

These dyestuff salts are obtained by reacting a compound of the formula

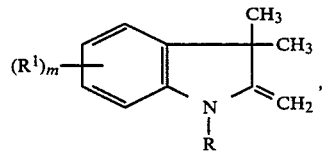

IX wherein R, $R^1$ and m have the same meaning as in the formula I,
with equimolar amounts of a compound of the formula

A—CHO  X, in which A has the meaning indicated in the formula I and with 1 to 5 mols of a compound of the formula

XI in which B has the same meaning as in the formula I in the presence of 0–30% of an organic solvent and 0–15% of water, the two percentages being relative to the total of the weights of IX and X.

In this reaction, a molar ratio of 0.9 to 1.2 mols of compound XI per 1 mol each of compounds IX and X is preferable.

The reaction is preferably carried out in a reaction apparatus which is capable of uniformly mixing, and grinding into a powder, viscous and later crystallising dyestuff melts.

Reaction screws, kneading apparatuses, paddle dryers and all-phase reactors are particularly suitable for this reaction.

The advantage of the new process is that a marketable dyestuff is obtained directly without passing through an aqueous phase from which the dyestuff has to be isolated by salting out, filtering off and drying. The new process thus produces no effluent, and the labour- and energy-intensive drying stage of the dyestuff isolated from the solution is dispensed with.

Examples of suitable compounds of the general formula IX are 1,3,3-trimethyl-2-methyleneindoline, 1,3,3,5-tetramethyl-2-methyleneindoline, 1,3,3-trimethyl-5-chloro-2-methyleneindoline, 1,3,3-trimethyl-5-methoxy-2-methyleneindoline, 1,3,3-trimethyl-5-ethoxy-2-methyleneindoline, 1,3,3-trimethyl-5-hydroxyethoxy-2-methyleneindoline, 1,3,3-trimethyl-5-carbomethoxy-2-methyleneindoline, 1,3,3-trimethyl-5-phenoxy-2-methyleneindoline, 1,3,3-trimethyl-5-benzyloxy-2-methyleneindoline, 1,3,3-trimethyl-5-benzyl-2-methyleneindoline, 1,3,3-trimethyl-5-(p-chlorophenoxy)-2-methyleneindoline, 1,3,3-trimethyl-5-(p-methylphenoxy)-2-methyleneindoline, 1,3,3-trimethyl-7-chloro-2-methyleneindoline, 1,3,3-trimethyl-5,7-dichloro-2-methyleneindoline, 1,3,3-trimethyl-5-chloro-7-methoxy-2-methyleneindoline, 1-ethyl-2,2-dimethyl-5-ethoxy-2-methyleneindoline, 1-ethyl-3,3-dimethyl-5-carbethoxy-2-methyleneindoline, 1,3,3-trimethyl-5-methylsulphonyl-2-methyleneindoline and 1,3,3-trimethyl-5-phenylsulphonyl-2-methyleneindoline.

Examples of suitable compounds of the general formula X are 4-dimethylaminobenzaldehyde, 4-diethylaminobenzaldehyde, 4-(N-methyl-N-β-chloromethylamino)-benzaldehyde, 4-[bis-(β-chloroethyl)-amino]-benzaldehyde, 4-(N-ethyl-N-β-chloroethylamino)-benzaldehyde, 4-(N-methyl-N-β-cyanoethylamino)-benzaldehyde, 4-(N-ethyl-N-β-cyanoethylamino)-benzaldehyde, 4-(N-ethyl-N-β-methoxyethylamino)-benzaldehyde, 4-(N-ethyl-N-β-ethoxyethylamino)-benzaldehyde, 4-(N-methyl-N-acetoxyethylamino)-benzaldehyde, 4-(N-methyl-N-carboxamidoethylamino)-benzaldehyde, 4-(N-ethyl-N-carboxamido-ethylamino)-benzaldehyde, 4-[bis-(β-cyanoethyl)-amino]-benzaldehyde, 4-(N-methyl-N-phenylamino)-benzaldehyde, 4-N-methyl-N-(4-ethoxyphenylamino)-benzaldehyde, 4-(N-ethyl-N-phenylamino)-benzaldehyde, 4-(N-methyl-N-benzylamino)-benzaldehyde, 4-(N-ethyl-N-benzylamino)-benzaldehyde, 4-[bis-(benzyl)-amino]-benzaldehyde, 2-methyl-4-dimethylaminobenzaldehyde, 2-methyl-4-diethylaminobenzaldehyde, 2-methyl-4-(N-ethyl-N-β-chloroethylamino)-benzaldehyde, 2-methyl-4-(N-ethyl-N-β-cyanoethylamino)-benzaldehyde, 2-methyl-4-(N-methyl-N-benzylamino)-benzaldehyde, 2-chloro-4-dimethylaminobenzaldehyde, 2-chloro-4-diethylaminobenzaldehyde, 2-methoxy-4-dimethylaminobenzaldehyde, 2-methoxy-4-diethylaminobenzaldehyde, 2-ethoxy-4-dimethylaminobenzaldehyde, 2-ethoxy-4-diethylaminobenzaldehyde, 2-ethyl-6-formyl-1,2,3,4-tetrahydroquinoline, 1-ethyl-2,2,4-trimethyl-6-formyl-1,2,3,4-tetrahydroquinoline, 1-ethyl-2-methyl-5-formyl-2,3-dihydroindole, 1,2,3,4-tetramethyl-5-formyl-2,3-dihydroindole, 4-methyl-7-formyl-2,3-dihydrobenzoxazine, 2-methylindole-3-aldehyde, 1,2-dimethylindole-3-aldehyde, 1-ethyl-2l -methylindole-3-aldehyde, 1-hydroxyethyl-2-methylindole-3-aldehyde, 1-β-cyanoethyl-2-methylindole-3-aldehyde, 2-methyl-5-chloroindole-3-aldehyde, 2,5-dimethylindole-3-aldehyde, 2-methyl-5-ethoxyindole-3-aldehyde, 1,2,5-trimethylindole-3-aldehyde, 1,2-dimethyl-5-chloroindole-3-aldehyde, 1,2-dimethyl-5-methoxyindole-3-aldehyde, 1-methyl-2-phenylindole-3-aldehyde, 1-ethyl-2-phenylindole-3-aldehyde, 1-hydroxyethyl-2-phenylindole-3-aldehyde, 1-cyanoethyl-2-phenylindole-3-aldehyde, 1-methyl-2-phenyl-5-chloroindole-3-aldehyde, 1,5-dimethyl-2-phenylindole-3-aldehyde, 1-methyl-2-phenyl-5-methoxyindole-3-aldehyde, 1-methyl-2-(4-methoxyphenyl)-1-indole-3-aldehyde, 1-methyl-2-(4-chlorophenyl)-indole-3-aldehyde, 1-methyl-2-(4-methylphenyl)-indole-3-aldehyde, 1,3,3-trimethyl-2-methyleneindoline-ω-aldehyde, 1,3,3,5-tetramethyl-2-methyleneindoline-ω-aldehyde, 1,3,3-trimethyl-5-chloro-2-methyleneindoline-ω-aldehyde, 1,3,3-trimethyl-5-methoxy-2-methyleneindoline-ω-aldehyde, 1,3,3-trimethyl-5-carbethoxy-2-methyleneindoline-ω-aldehyde, 1,3,3-trimethyl-5-methylsulphonyl-2-methyleneindoline-ω-aldehyde, 1,3,3-trimethyl-5-benzyl-2-methyleneindoline-ω-aldehyde, 1,3,3-trimethyl-5-benzyloxy-2-methyleneindoline-ω-aldehyde, 1,3,3-trimethyl-5-(4-chlorophenoxy)-2-methyleneindoline-ω-aldehyde, 1,3,3-trimethyl-5-(2-chlorophenoxy)-2-methyleneindoline-ω-aldehyde, 1,3,3-trimethyl-7-methoxy-2-methyleneindoline-ω-aldehyde, 1,3,3-trimethyl-5-chloro-7-methoxy-2-methyleneindoline-ω-aldehyde, 1,3,3-trimethyl-5,7-dimethoxy-2-methyleneindoline-ω-aldehyde, 1,3,3-trimethyl-2-cyanomethyleneindoline-ω-aldehyde, 1,3,3-trimethyl-5-methoxy-2-cyanomethyleneindoline-ω-aldehyde, 1,3,3-trimethyl-5-chloro-2-cyanomethyleneindoline-ω-aldehyde and 1,3,3,5-tetramethyl-2-cyanomethyleneindoline-ω-aldehyde.

The intermediate products of the formulae IX and X, which are suitable for the process, can be found in many patent specifications, including the following which may be mentioned:

German Patent Specification Nos. 614,325, 615,130, 711,665, 721,020, 730,336, 742,039, 744,019, 891,120, 1,070,316 and 1,099,670.

German Auslegeschriften Nos. 1,044,022, 1,049,994, 1,158,646, 1,569,734, 2,031,202, 2,040,872 and 2,234,468, German Offenlegungsschriften Nos. 1,929,417, 2,040,652, 2,040,653, 2,064,881, 2,064,882, 2,101,223, 2,130,790, 2,135,834, 2,200,027, 2,202,300, 2,243,627 and 2,726,437, U.S. Pat. Nos. 2,815,338, 3,394,130, 3,865,837 and 3,888,850, Japanese Patent Specification Nos. 69/3,217, 66/13,748, 65/19,951, 49/14,525, 49/72,477, 49/74,217, 50/05,683, 73/12,460, 73/13,752, 74/04,531 and 76/35,405, French Patent Specification No. 1,261,976 and Belgian Patent Specification No. 734,765.

Suitable dicarboxylic acids of the general formula XI are oxalic acid, tartaric acid, malic acid and citric acid.

The reaction can also be carried out in the presence of a solvent, which is distilled off from the reaction apparatus during the reaction or after the conversion is complete. The amount of solvent added is at most 30% of the total of the weights of IX and X.

Possible solvents are toluene, xylene, chlorobenzene, dichlorobenzene, acetone, tetrahydrofuran, dioxane and dimethylglycol.

The reaction can also be carried out in the presence of water constituting at most 15% of the total of the weights of IX and X and having been introduced, for example, as water of crystallisation of the acids.

However, the advantage of the new process is precisely the fact that in most cases the use of a solvent can be dispensed with.

If a paddle dryer is used as the reaction vessel, marketable dyestuff formulations can be obtained directly by adding customarily added standardising agent, such as sodium sulphate, sodium chloride or dextrin, before, during or after the reaction. The addition of inorganic salts, in particular sodium sulphate, already at the start of the reaction is an advantage, since the formation of crusts on the reactor wall is thereby prevented. The reaction is carried out at temperatures between 40° and 120° C., the preferable temperature range being 60°–100° C.

The dyestuffs prepared according to the invention are suitable for dyeing/colouring natural and synthetic substrates. They are suitable for dyeing tannin-mordanted cotton and acid-modified polyamide and polyester fibres, but they are particularly suitable for dyeing polyacrylonitrile fibre materials. They are also suitable for dyeing wood-containing paper and leather and for preparing ballpoint pen pastes, inks and stamping inks.

EXAMPLE 1

950 g of 4-(N-methyl-N-cyanoethylamino)-benzaldehyde and 865 g of 1,3,3-trimethyl-2-methyleneindoline are stirred at 75° C. until a homogeneous melt has formed, in a laboratory paddle dryer of approximately 3 l capacity. The heating is then turned off. 450 g of anhydrous oxalic acid are added. A bronzing melt forms within 8 minutes and after a further 3 minutes the dyestuff crystallises out. The heating bath of the paddle dryer is then again heated to 100° C. and maintained for 2 hours at 100° C. The water formed in the condensation is then distilled off in the course of 3 hours at 100° C. in the vacuum of a water jet pump. The bath is then allowed to cool down while stirring, and the pulverulent dyestuff is removed from the reaction apparatus. 2,110 g of the dyestuff of the formula:

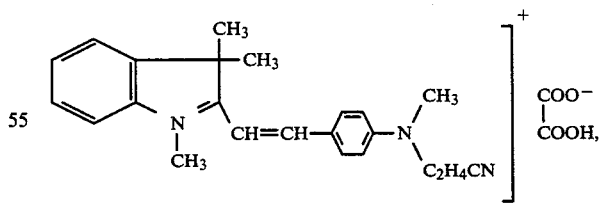

which dyes polyacrylonitrile in brilliant red shades, are obtained. (C. I. Hue Indication Chart No. 49).

If 1,3,3-trimethyl-2-methyleneindoline is replaced by an equimolar amount of 1,3,3,5-tetramethyl-2-methyleneindoline, 1,3,3,-trimethyl-5-chloro-2-methyleneindoline, 1,3,3-trimethyl-5-methoxy-2-methyleneindoline, 1,3,3-trimethyl-5,7-dichloro-2-methyleneindoline or 1,3,3-trimethyl-5-chloro-7-methoxy-2-methyleneindoline and the procedure used is otherwise the same, the corresponding dyestuffs are obtained in the form of their oxalates, which dye polyactrylonitrile materials in brilliant red shades.

EXAMPLE 2

In an approximately 3 l capacity laboratory paddle dryer equipped with beater bars, 865 g of 1,3,3-trimethyl-2-methyleneindoline and 745 g of 4-dimethylaminobenzaldehyde are stirred at 50° C. to give a homogeneous melt, and 450 g of anhydrous oxalic acid are added. After 4 minutes a bronzing melt forms, and after a further 2 minutes the dyestuff crystallises out. The heating bath of the paddle dryer is then heated to 100° C., and stirring is carried out for 3 hours at this temperature. The water liberated in the condensation reaction is then distilled off in the course of 2 hours at 100° C. in the vacuum of a water jet pump, and the paddle dryer is continued to be stirred until it has cooled down. The dyestuff powder is then removed from the reaction apparatus. 1,956 g of the dyestuff of the formula:

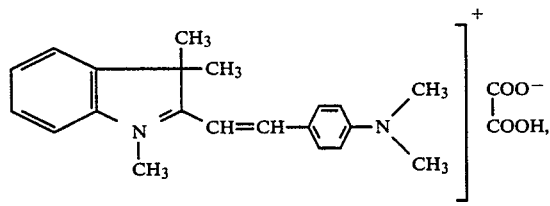

which dyes polyacrylonitrile in clear bluish-tinged red shades, are obtained. (C. I. Hue Indication Chart No. 9).

If the 4-dimethylaminobenzaldehyde used here is replaced by an equimolar amount of 2-methyl-4-dimethylaminobenzaldehyde, 2-chloro-4-dimethylaminobenzaldehyde, 2-methoxy-4-dimethylaminobenzaldehyde, 4-(N-methyl-N-benzylamino)-benzaldehyde, 4-(N-ethyl-N-benzylamino)-benzaldehyde, 4-dibenzylaminobenzaldehyde or 4-(N-methyl-N-phenylamino)-benzaldehyde and the procedure used is otherwise the same, likewise valuable dyestuffs are obtained in the form of their oxalates, which dye polyacrylonitrile in bluish-tinged red shades.

EXAMPLE 3

531 g of 4-diethylaminobenzaldehyde and 519 g of 1,3,3-trimethyl-2-methyleneindoline are heated to 45° C. in an approximately 3 l capacity laboratory paddle dryer equipped with beater bars. 270 g of oxalic acid are added to the homogeneous melt and the temperature increases to 88° C. in the course of 14 minutes. The dyestuff then crystallises out and the temperature increases to 98° C. The batch is then heated for a further 2 hours at 100° C., then for a further 30 minutes under the vacuum of a water jet pump and for 30 minutes in the vacuum of an oil pump, the water liberated in the condensation reaction distilling off in the descending condenser. 1,251 g of a pulverulent dyestuff of the formula:

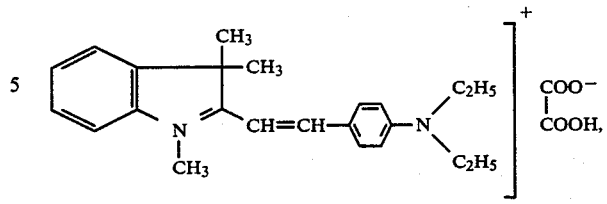

which dyes polyacrylonitrile in a deep bluish-tinged red, are obtained (C. I. Hue Indication Chart No. 10).

If 4-diethylaminobenzaldehyde is replaced by an equimolar amount of 2-methyl-4-diethylaminobenzaldehyde, 2-chloro-4-diethylaminobenzaldehyde, 2-methoxy-4-diethylaminobenzaldehyde, 2-methyl-4-(N-ethyl-N-β-cyanoethylamino)-benzaldehyde, 2-methyl-4-[bis-(β-cyanoethyl)-amino]-benzaldehyde or 4-(N-ethyl-N-carboxamidoethylamino)-benzaldehyde and the procedure used is otherwise the same, likewise pulverulent dyestuffs are obtained in the form of their oxalates, which dye polyacrylonitrile in brilliant bluish-tinged red shades.

EXAMPLE 4

225 g of 2-methyl-4-(N-ethyl-N-β-chloroethylamino)-benzaldehyde and 173 g of 1,3,3-trimethyl-2-methyleneindoline are dissolved at 45° C. in a laboratory reactor. 90 g of oxalic acid are added at 80° C. and the temperature increases to 100° C. After stirring for 1.5 hours at 100° C., the dyestuff crystallises out. Stirring is continued at 100° C. for a total of 3 hours, and the water of reaction is then distilled off first for 30 minutes in the vacuum of a water jet pump and then for a further 30 minutes under 5 mm Hg. 428 g of a dyestuff of the formula:

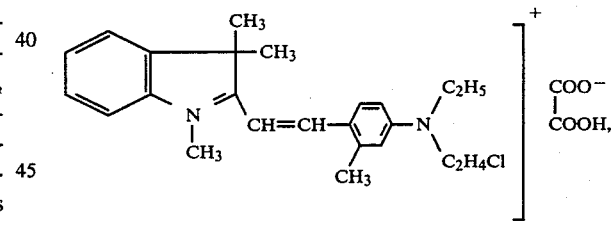

which dyes polyacrylonitrile fibres in bluish-tinged red shades, are obtained. (C. I. Hue Indication Chart No. 10).

If 1,3,3-trimethyl-2-methyleneindoline is replaced by an equimolar amount of 1,3,3-trimethyl-5-methylsulphonyl-2-methyleneindoline, 1,3,3-trimethyl-5-phenylsulphonyl-2-methyleneindoline, 1,3,3-trimethyl-5-acetyl-2-methyleneindoline or 1,3,3-trimethyl-5-phenoxy-2-methyleneindoline and the procedure used is otherwise the same, likewise valuable dyestuffs are obtained in the form of their oxalates, which dye polyacrylonitrile fibres in bluish-tinged red shades.

EXAMPLE 5

In a laboratory reactor, 197.5 g of 4-(N-methyl-N-β-chloroethylamino)-benzaldehyde and 173 g of 1,3,3-trimethyl-2-methyleneindoline are stirred at 45° C. to give a homogeneous melt, and 90 g of oxalic acid are added. The temperature increases up to 70° C. and the dyestuff crystallises out after 30 minutes. Stirring is continued for a further 2 hours at 100° C., and the water of reaction is then distilled off for 30 minutes under 15 mm Hg and for a further 30 minutes under 5 mm Hg. 434 g of a pulverulent dyestuff of the formula:

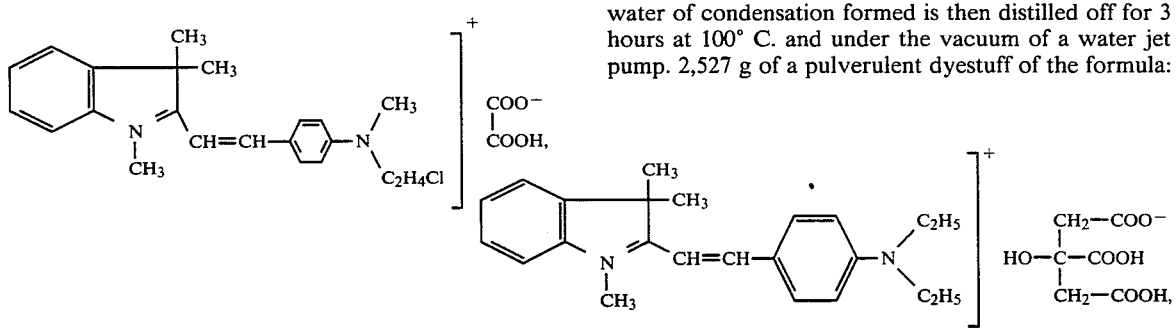

which dyes polyacrylonitrile fibres in a bluish-tinged pink are obtained. (C.I. Hue Indication Chart No. 50).

If 1,3,3-trimethyl-2-methyleneindoline is replaced by an equimolar amount of 1,3,3-trimethyl-5-carbethoxy-2-methyleneindoline, 1-ethyl-3,3-dimethyl-5-carbethoxy-2-methyleneindoline or 1,3,3-trimethyl-5-benzyl-2-methyleneindoline and the procedure used is otherwise the same, likewise valuable dyestuffs are obtained which dye polyacrylonitrile fibres in bluish-tinged pink shades.

EXAMPLE 6

In a laboratory reactor, 149 g of 4-dimethylaminobenzaldehyde and 173 g of 1,3,3-trimethyl-2-methyleneindoline are stirred at 50° C. to give a homogeneous melt, and 150 g of tartaric acid are then added. The mixture is then heated to 100° C. After stirring for 1 hour, the dyestuff crystallises out. Stirring is continued at 100° C. for a total of 4 hours, and the water formed in the condensation reaction is then distilled off in the course of 1 hour at 100° C. and under a vacuum of 15 mm Hg. 458 g of a pulverulent dyestuff of the formula:

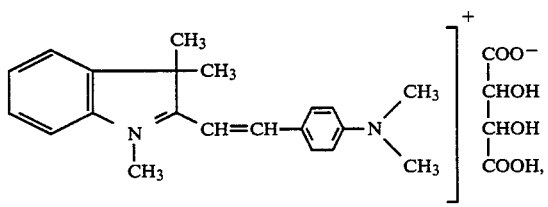

which dyes polyacrylonitrile in a bluish-tinged red are then obtained. (C.I. Hue Indication Chart No. 9).

If the 149 g of 4-dimethylaminobenzaldehyde are replaced by 195 g of 4-(N-methyl-N-β-cyanoethylamino)-benzaldehyde and the procedure used is otherwise the same, 482 g of a pulverulent dyestuff which dyes polyacrylonitrile in a brilliant yellowish-tinged red are obtained.

EXAMPLE 7

In a laboratory paddle dryer, 885 g of 4-diethylaminobenzaldehyde and 880 g of 1,3,3-trimethyl-2-methyleneindoline are heated at 60° C. until a homogeneous melt has been produced. 1,050 g of citric acid are then added, and the reaction mixture is heated to 100° C. The dyestuff crystallises out after 30 minutes. Stirring is continued for a further 2 hours at 100° C., and the water of condensation formed is then distilled off for 3 hours at 100° C. and under the vacuum of a water jet pump. 2,527 g of a pulverulent dyestuff of the formula:

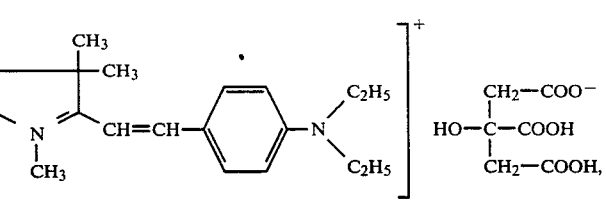

which dyes polyacrylonitrile fibres in a deep bluish-tinged red are then obtained. (C.I. Hue Indication Chart No. 10).

EXAMPLE 8

In a laboratory reactor, 177 g of 4-diethylaminobenzaldehyde and 178 g of 1,3,3-trimethyl-2-methyleneindoline are stirred at 50° C. until a homogeneous melt forms. 150 g of tartaric acid are then added, and the reaction temperature is increased to 100° C. The dyestuff crystallises out after 30 minutes. The reaction mixture is stirred for a total of 3 hours at 100° C., and the water of condensation formed is then distilled off in the course of 1 hour in the vacuum of a water jet pump. 464 g of a pulverulent dyestuff of the formula:

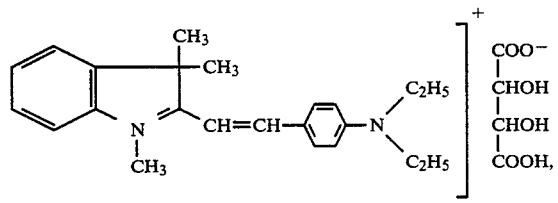

which dyes polyacrylonitrile fibres in deep bluish-tinged red shades are obtained. (C.I. Hue Indication Chart No. 10).

If tartaric acid is replaced by an equimolar amount of malic acid or mucic acid and the procedure used is otherwise the same, likewise valuable dyestuffs are obtained which dye polyacrylonitrile in bluish-tinged red shades.

EXAMPLE 9

In a laboratory paddle dryer, 603 g of 1,3,3-trimethyl-2-methyleneindoline-ω-aldehyde and 519 g of 1,3,3-trimethyl-2-methyleneindoline are heated to 75° C., and 270 g of anhydrous oxalic acid are added in the course of 20 minutes. The reaction mixture is then heated to 100° C. and stirred for 6 hours at 100° C. After 30 minutes the crystallisation of the dyestuff commences. The reaction batch is stirred for 6 hours at 100° C., and the water of condensation is then distilled off for 4 hours at 100° C. in the vacuum of a water jet pump. 1,280 g of a pulverulent dyestuff of the formula:

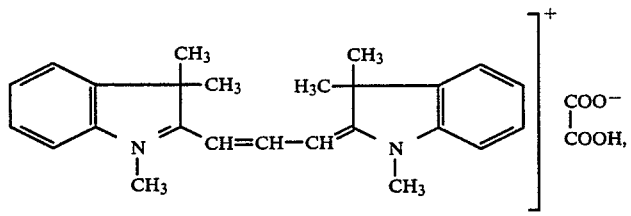

which dyes wood-containing paper in brilliant red shades are obtained. (C.I. Hue Indication Chart No. 51).

If 1,3,3-trimethyl-2-methyleneindoline-ω-aldehyde is replaced by equimolar amounts of 1,3,3-trimethyl-5-methoxy-2-cyanomethyleneindoline-ω-aldehyde or 1,3,3,5-tetramethyl-2-cyanomethyleneindoline-ω-aldehyde and the procedure used is otherwise the same, likewise valuable dyestuffs are obtained which dye paper in brilliant red shades.

EXAMPLE 10

In a laboratory reactor, 201 g of 1,3,3-trimethyl-2-methyleneindoline-ω-aldehyde and 203 g of 1,3,3-trimethyl-5-methoxy-2-methyleneindoline are heated at 60° C. until a clear melt has been formed. 90 g of oxalic acid are then added, and the reaction mixture is heated to 100° C. The crystallisation of dyestuff commences after 30 minutes. The batch is stirred for 17 hours at 100° C., and the water of condensation formed is then distilled off in vacuo. 427 g of a pulverulent dyestuff of the formula:

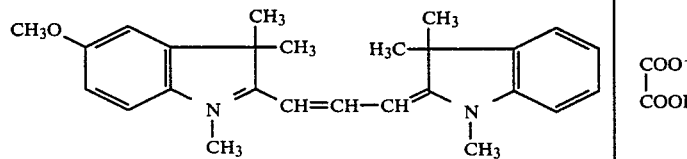

which dyes paper in brilliant red shades are obtained. (C.I. Hue Indication Chart No. 51).

EXAMPLE 11

In a laboratory reactor, 159 g of 2-methylindole-3-aldehyde and 173 g of 1,3,3-trimethyl-2-methyleneindoline are heated to 80° C., and 90 g of oxalic acid are added. A melt forms from which the dyestuff crystallises out after 30 minutes. Stirring is continued for 1 hour at 100° C., and the water of condensation is then distilled off in the vacuum of a water jet pump. 378 g of a pulverulent dyestuff of the formula:

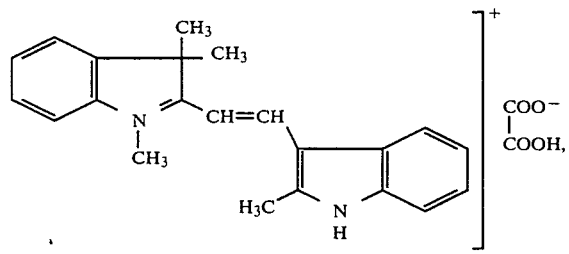

which dyes polyacrylonitrile fibres orange are obtained. (C.I. Hue Indication Chart No. 4).

If an equimolar amount of 1,3,3-trimethyl-5-methoxy-2-methyleneindoline or 1,3,3-trimethyl-5-chloro-2-methyleneindoline is used instead of 1,3,3-trimethyl-2-methyleneindoline and the procedure used is otherwise the same, likewise valuable dyestuffs are obtained which dye polyacrylonitrile orange.

EXAMPLE 12

In a laboratory reactor, 406 g of 1,3,3-trimethyl-5-methoxy-2-methyleneindoline and 298 g of 4-dimethylaminobenzaldehyde are heated to 50° C., and 185 g of oxalic acid are then added. The temperature increases within 3 minutes to 80° C. and the dyestuff crystallises out. After stirring for 5 hours at 95° C., a pulverulent dyestuff of the formula

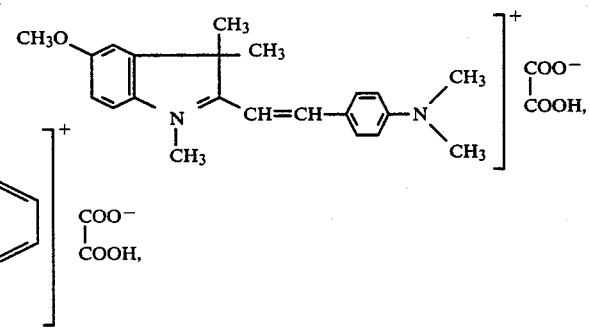

which dyes polyacrylonitrile fibres in a bluish-tinged red is obtained. (C.I. Hue Indication Chart No. 10).

If 354 g of 4-diethylaminobenzaldehyde are used instead of 298 g of 4-dimethylaminobenzaldehyde and the procedure used is otherwise the same, a pulverulent dyestuff is obtained which dyes polyacrylonitrile in a strongly bluish-tinged red. (C.I. Hue Indication Chart No. 11).

If 376 g of 4-(N-methyl-N-β-cyanoethylamino)-benzaldehyde are used instead of 4-dimethylaminobenzaldehyde and the procedure used is otherwise as indicated above, a pulverulent dyestuff is obtained which dyes polyacrylonitrile in yellowish-tinged red shades.

EXAMPLE 13

In a laboratory reactor, 260 g of 1,3,3-trimethyl-2-methyleneindoline and 368 g of 4-[N-methyl-N-(4-ethoxyphenyl)-amino]-benzaldehyde are heated to 50° C., and 100 g of oxalic acid are then added. The melt is then warmed to 100° C., and the dyestuff begins to crystallise out after a few minutes. The reaction mixture is stirred for 8 hours at 95° C., and the pulverulent dyestuff is then removed from the apparatus. The dyestuff dyes polyacrylonitrile materials in reddish-tinged violet shades. (C.I. Hue Indication Chart No. 11).

EXAMPLE 14

In a laboratory reactor, 260 g of 1,3,3-trimethyl-2-methyleneindoline, 368 g of 4-[N-methyl-N-(4-ethoxyphenyl)-amino]-benzaldehyde and 100 g of toluene are heated to 80° C. 200 g of oxalic acid are added, and the reaction mixture is stirred for 12 hours at 95° C. Toluene and the water of condensation are then distilled off in the vacuum of a water jet pump, and the melt crystallises. The resulting pulverulent dyestuff of the formula:

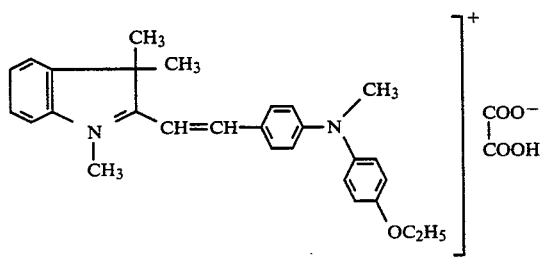

dyes polyacrylonitrile in reddish-tinged violet shades. (C.I. Hue Indication Chart No. 11).

EXAMPLE 15

In a laboratory reactor, 462 g of 1,3,3-trimethyl-5-carbomethoxy-2-methyleneindoline and 298 g of 4-dimethylaminobenzaldehyde are stirred at 50° C., and 185 g of oxalic acid are then added. This increases the temperature of the melt in the course of 5 minutes to 80° C., and the dyestuff crystallises out. After stirring for 6 hours at 95° C., the crystalline dyestuff is removed from the apparatus. The dyestuff dyes polyacrylonitrile fibres in a strongly bluish-tinged red. (C.I. Hue Indication Chart No. 10).

If 354 g of 4-diethylaminobenzaldehyde are used instead of 298 g of dimethylaminobenzaldehyde and the procedure used is otherwise the same, the result is again a valuable dyestuff which dyes polyacrylonitrile fibres in a strongly bluish-tinged red. (C.I. Hue Indication Chart No. 11).

If 4-dimethylaminobenzaldehyde is replaced by 376 g of 4-(N-methyl-N-β-cyanoethylamino)-benzaldehyde and the other reaction conditions are left unchanged, a pulverulent dyestuff is obtained which dyes polyacrylonitrile in a yellowish-tinged red. (C.I. Hue Indication Chart No. 50).

EXAMPLE 16

In a laboratory reactor, 415 g of 1,3,3-trimethyl-5-chloro-2-methyleneindoline and 330 g of 4-diethylaminobenzaldehyde are stirred at 50° C., and 170 g of oxalic acid are then added. The temperature of the melt increases within 10 minutes to 90° C. The dyestuff then crystallises out. The reaction mixture is stirred for 2 hours at 95° C., and the water of condensation is then distilled off in the vacuum of a water jet pump. A pulverulent dyestuff of the formula:

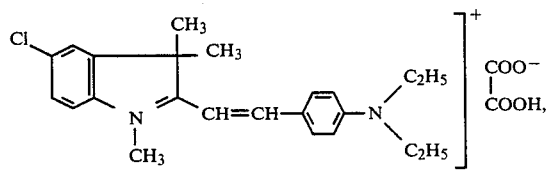

which dyes polyacrylonitrile in strongly bluish-tinged red shades is obtained. (C.I. Hue Indication Chart No. 10).

If 4-diethylaminobenzaldehyde is replaced by 376 g of 4-(N-methyl-N-β-cyanoethylamino)-benzaldehyde and the procedure used is otherwise the same, the result is again a valuable dyestuff which dyes polyacrylonitrile materials in a yellowish-tinged red. (C.I. Hue Indication Chart No. 49).

EXAMPLE 17

In a laboratory reactor, 560 g of 1,3,3-trimethyl-5-benzyloxy-2-methyleneindoline and 298 g of 4-dimethylaminobenzaldehyde are stirred at 50° C. to give a homogeneous melt. 185 g of oxalic acid are then added. The temperature increases within 15 minutes to 95° C., and the dyestuff then crystallises out. Stirring is continued for a further 4 hours at 95° C., and the water of condensation is then distilled off in vacuo. 965 g of a pulverulent dyestuff of the formula:

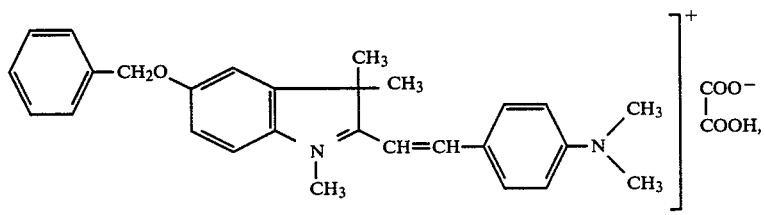

which dyes polyacrylonitrile fibres in a strongly bluish-tinged red are obtained. (C.I. Hue Indication Chart No. 10).

If 4-dimethylaminobenzaldehyde is replaced by 354 g of diethylaminobenzaldehyde and the procedure used is otherwise the same, the result is again a valuable dyestuff which dyes polyacrylonitrile fibres in a strongly bluish-tinged red. (C.I. Hue Indication Chart No. 11).

EXAMPLE 18

382 g of 2-methyl-4-diethylaminobenzaldehyde and 346 g of 1,3,3-trimethyl-2-methyleneindoline are stirred at 50° C. to give a homogeneous melt, and 185 g of oxalic acid are then added. The reaction mixture is then heated at 95° C., and after stirring for 3 hours, crystallisation commences. Heating is continued for a further 3 hours at 95° C., and the water of condensation is then distilled off. 904 g of a pulverulent dyestuff of the formula:

cool down while stirring. 537 g of a dyestuff salt of the formula:

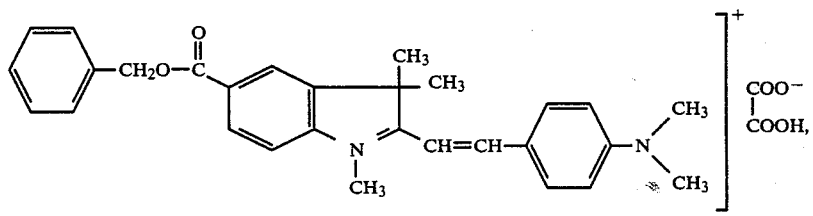

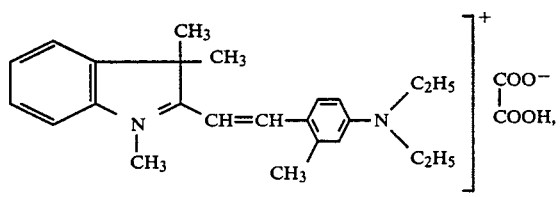

which dyes polyacrylonitrile fibres in a strongly bluish-tinged red are obtained. (C.I. Hue Indication Chart No. 10).

EXAMPLE 19

In a laboratory reactor, 216 g of 2-methyl-4-(N-ethyl-N-β-cyanoethylamino)-benzaldehyde and 173 g of 1,3,3-trimethyl-2-methyleneindoline are stirred at 50° C. to give a homogeneous melt, and 95 g of oxalic acid are then added. This warms the melt to 70° C. Stirring is continued for a further 8 hours at 95° C., and the water of condensation is then distilled off in the vacuum of a water jet pump. The batch is allowed to cool down while stirring; during this period, the dyestuff crystallises out. 474 g of a pulverulent dyestuff of the formula:

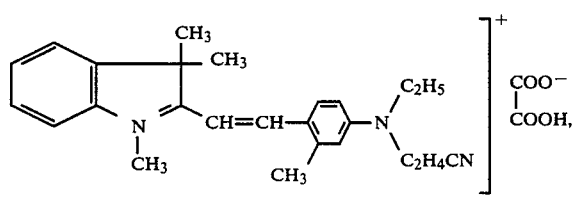

which dyes polyacrylonitrile fibres in a clear red are obtained. (C.I. Hue Indication Chart No. 50).

EXAMPLE 20

In a laboratory reactor, 307 g of 1,3,3-trimethyl-4-carbobenzyloxy-2-methyleneindoline and 149 g of 4-dimethylaminobenzaldehyde are stirred at 70° C. to give a homogeneous melt, and 95 g of oxalic acid are then added. The batch is then heated to 95° C., whereupon crystallisation of the dyestuff commences after a few minutes. The batch is stirred for 4 hours at 95° C., the water formed during the reaction is distilled off in the vacuum of a water jet pump, and the batch is allowed to cool down while stirring. 537 g of a dyestuff salt of the formula:

which dyes polyacrylonitrile fibres in strongly bluish-tinged red shades are obtained. (C.I. Hue Indication Chart No. 10).

EXAMPLE 21

In a laboratory reactor, 215 g of 1,3,3,4,5,7-hexamethyl-2-methyleneindoline and 149 g of 4-dimethylaminobenzaldehyde are stirred at 50° C. to give a homogeneous melt, and 95 g of oxalic acid are then added. The melt is heated at 95° C., whereupon crystallisation commences after a few minutes. The batch is then stirred for a further 4 hours at 95° C., and the water of condensation is then distilled off in the vacuum of a water jet pump. Finally, the batch is allowed to cool down while stirring. 442 g of a dyestuff salt of the formula:

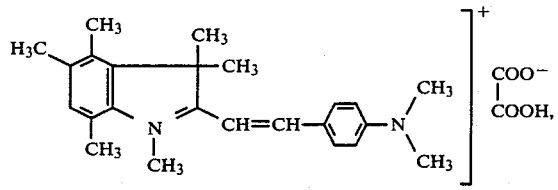

which dyes polyacrylonitrile fibres in a bluish-tinged red are obtained. (C.I. Hue Indication Chart No. 10).

If the same amount of 1,3,3-trimethyl-7-isopropyl-2-methyleneindoline is used instead of 1,3,3,4,5,7-hexamethyl-2-methyleneindoline and the procedure used is otherwise the same, the result is again a valuable dyestuff which dyes polyacrylonitrile fibres in bluish-tinged red shades. (C.I. Hue Indication Chart No. 10).

EXAMPLE 22

263 g of 1,3,3-trimethyl-5-benzyl-2-methyleneindoline and 149 g of 4-dimethylaminobenzaldehyde are stirred at 50° C. to give a homogeneous melt, and 95 g of oxalic acid are added. The melt warms within 2 minutes to 78° C., and crystals form during the heating-up to 95° C. The batch is stirred for 4 hours at 95° C., and the water of condensation is then distilled off in the vacuum of a water jet pump. A dyestuff salt of the formula:

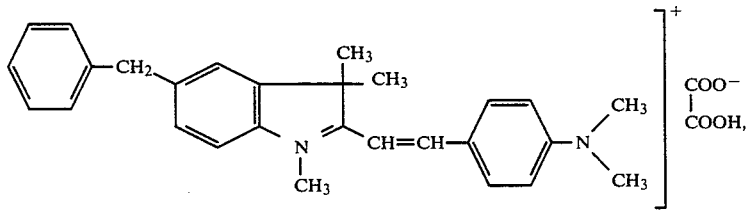

which dyes polyacrylonitrile fibres in a bluish-tinged red is obtained. (C.I. Hue Indication Chart No. 9).

If an equimolar amount of 1,3,3,4,6,7-hexamethyl-2-methyleneindoline is used instead of 1,3,3-trimethyl-5-benzyl-2-methyleneindoline and the procedure used is otherwise the same, the result is again a dyestuff salt which dyes polyacrylonitrile fibres bluish-tinged red. (C.I. Hue Indication Chart No. 10).

EXAMPLE 23

In a laboratory reactor, 150 g of 1-methyl-2-phenylindole-3-aldehyde and 111 g of 1,3,3-trimethyl-2-methyleneindoline are stirred at 70° C., and 58 g of oxalic acid are then added. The batch is then heated to 95° C. and the dyestuff crystallises out after 10 minutes. Heating is continued for a further 2 hours at 95° C., and the water of condensation is then distilled off in the vacuum of a water jet pump. A dyestuff salt of the formula:

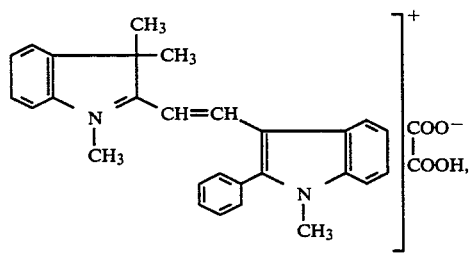

which dyes polyacrylonitrile fibres in a reddish-tinged orange is obtained. (C.I. Hue Indication Chart No. 6).

If 1,3,3-trimethyl-2-methyleneindoline is replaced by an equimolar amount of 1,3,3-trimethyl-5-methoxy-2-methyleneindoline and the procedure used is otherwise the same, the result is again a dye salt which dyes polyacrylonitrile fibres in strongly reddish-tinged orange shades. (C.I. Hue Indication Chart No. 7).

EXAMPLE 24

In a laboratory reactor, 203 g of 1-β-hydroxyethyl-3,3-dimethyl-2-methyleneindoline and 149 g of 4-dimethylaminobenzaldehyde are stirred at 50° C. to give a homogeneous melt, and 95 g of oxalic acid are then added. The melt is then further stirred at 95° C., and this produces crystals and a temperature increase up to 107° C. The batch is then stirred for a further 4 hours at 95° C.-100° C., and the water of condensation is then distilled off in the vacuum of a water jet pump. The batch is then allowed to cool down while stirring, and 433 g of a dye salt of the formula

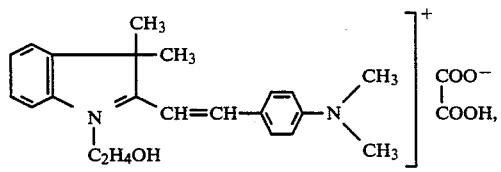

which dyes polyacrylonitrile fibres in bluish-tinged red shades are obtained. (C.I. Hue Indication Chart No. 9).

If 1-β-hydroxyethyl-3,3-dimethyl-2-methyleneindoline is replaced by an equimolar amount of 1,3,3,5-tetramethyl-2-methyleneindoline and the procedure used is otherwise the same, the result is again a dye salt which dyes polyacrylonitrile fibres bluish-tinged red. (C.I. Hue Indication Chart No. 9).

EXAMPLE 25

In a laboratory reactor, 215 g of 1,3,3,5-tetramethyl-2-methyleneindoline-ω-aldehyde and 173 g of 1,3,3-trimethyl-2-methyleneindoline are stirred at 90° C. to give a homogeneous melt. 90 g of oxalic acid are then added, and the batch is heated to 100° C. After 35 minutes, the dyestuff crystallises out. The batch is stirred for a further 4 hours at 100° C., and the water of condensation is then distilled off in the vacuum of a water jet pump. The reaction mixture is allowed to cool down while stirring. 467 g of a dyestuff salt of the formula:

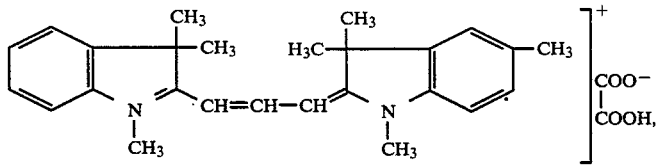

which dyes wood-containing paper bluish-tinged red are obtained. (C.I. Hue Indication Chart No. 51).

If 1,3,3,5-tetramethyl-2-methyleneindoline-ω-aldehyde is replaced by 231 g of 1,3,3-trimethyl-5-methoxy-2-methyleneindoline-ω-aldehyde and the procedure used is otherwise the same, the result is again a dye salt which dyes wood-containing paper in strongly bluish-tinged red shades. (C.I. Hue Indication Chart No. 10).

EXAMPLE 26

In a laboratory reactor, 259 g of 1,3,3-trimethyl-5-carboxymethyl-2-methyleneindoline-ω-aldehyde and 173 g of 1,3,3-trimethyl-2-methyleneindoline are heated to 100° C., and 90 g of oxalic acid are added. The temperature is then increased to 120° C., and the batch is stirred for 4 hours at this temperature. Crystallisation of the dyestuff commences after 45 minutes. The water of condensation is distilled off in the vacuum of a water jet pump, and the batch is allowed to cool down while stirring. 512 g of a dye salt of the formula:

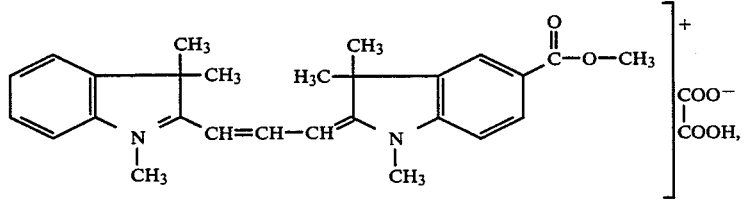

which dyes wood-containing paper in strongly bluish-tinged red shades are obtained. (C.I. Hue Indication Chart No. 10).

EXAMPLE 27

In a laboratory reactor, 157 g of 1,3,3-trimethyl-5-methoxy-2-cyanomethyleneindoline-ω-aldehyde and 106 g of 1,3,3-trimethyl-2-methyleneindoline are heated to 90° C., and 55 g of oxalic acid are added. The batch is warmed to 110° C. and is stirred at this temperature for 12 hours, crystallisation commencing after 2 hours. The resulting water of condensation is distilled off in the vacuum of a water jet pump, and the batch is allowed to cool down while stirring. 305 g of a dyestuff salt of the formula:

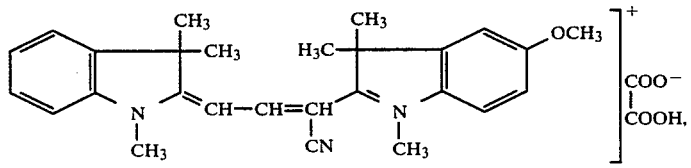

which dyes polyacrylonitrile fibres in red shades are obtained. (C.I. Hue Indication Chart No. 50).

EXAMPLE 28

In a laboratory reactor, 112.5 g of 2-methyl-4-(N-ethyl-N-β-chloroethylamino)-benzaldehyde and 86.5 g of 1,3,3-trimethyl-2-methyleneindoline are stirred at 30° C. together with 50 g of toluene, and 46 g of oxalic acid are then added. The melt is maintained first for 30 minutes at 50° C. and then heated to 70° C. After stirring for 1 hour at 70° C., the melt crystallises. Toluene and the water of condensation are then distilled off in the vacuum of a water jet pump, and the batch is stirred for a further 2 hours at 70° C. The dyestuff described in Example 4 is likewise obtained in a pulverulent form.

EXAMPLE 29

In a laboratory reactor, 249 g of 4-(N-ethyl-N-β-acetoxypropylamino)-benzaldehyde and 203 g of 1,3,3-trimethyl-5-methoxy-2-methyleneindoline are stirred at 50° C. to give a homogeneous melt, and 95 g of oxalic acid are then added. The batch is stirred for 5 hours at 95° C., during which period the dyestuff completely crystallises out. The resulting water of condensation is then distilled off in the vacuum of a water jet pump, and the batch is allowed to cool down while stirring. 532 g of a dyestuff of the formula:

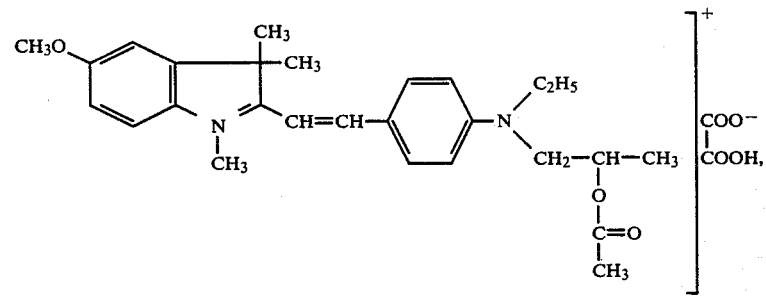

which dyes polyacrylonitrile fibres bluish-tinged red are obtained. (C.I. Hue Indication Chart No. 10).

EXAMPLE 30

Polyacrylonitrile yarn is introduced, in a hank dyeing apparatus, in a liquor ratio of 40/1 into a dye bath which contains, per liter, 0.06 g of the dyestuff described in Example 1 and 0.06 g of the product from reacting oleyl alcohol with 56 mols of ethylene oxide and which has been adjusted to a pH value of 4.5 by means of 60% strength acetic acid. The dye bath is heated to the boil, and dyeing is carried out for 90 minutes at the boiling temperature. The hank yarn is then rinsed and dried. It is dyed in a brilliant yellowish-tinged red. The dyestuffs described in the subsequent examples can be used in the same way for dyeing polyacrylonitrile.

We claim:
1. In the preparation of a dyestuff of the formula

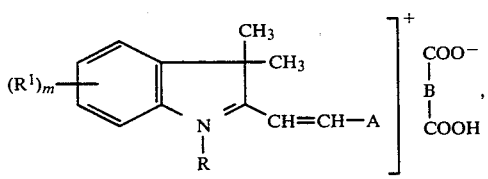

wherein

R represents an alkyl radical having 1 to 4 C atoms and which is optionally substituted by hydroxyl, alkoxy having 1 to 4 C atoms, acyloxy, halogen, cyano, carboxyl, $C_1$-$C_4$-carbalkoxy, carboxamido or acetyl, $R^1$ represents hydrogen, an alkyl radical having 1 to 4 C atoms, halogen, alkoxy having 1 to 4 C atoms, hydroxyalkoxy having 2-4 C atoms, a phenoxy radical which is optionally substituted by halogen, $C_1$-$C_4$-alkyl or $C_1$-$C_4$-alkoxy, benzyloxy, benzyl, carboxyl, an alkyl carboxylate having 1 to 4 C atoms, a carboxamide group optionally substituted by 1 or 2 $C_1$-$C_4$-alkyl radicals, a sulphonamide group optionally substituted by 1 or 2 $C_1$-$C_4$-alkyl radicals, alkylsulphonyl having 1 to 4 C atoms, phenylsulphonyl or a cyano, trifluoromethyl, acetyl or benzoyl group, and A represents a radical of the formula

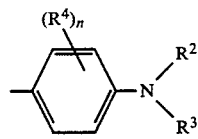

in which $R^2$ and $R^3$ independently of one another represent an alkyl radical having 1 to 4 C atoms and which is optionally substituted by hydroxyl, $C_1$-$C_4$-alkoxy, halogen, cyano, phenyl, carbalkoxy having 1 to 4 C atoms, carboxamide, acyloxy, benzyloxy, sulphonamido or acylamino, $R^2$ additionally also represents a phenyl or benzyl radical which is optionally substituted by halogen, $C_1$-$C_4$-alkyl or $C_1$ to $C_4$-alkoxy or $R^2$, together with the adjacent C atom of the benzene ring, can form a partially hydrogenated N- and, if appropriate, O-containing 5- or 6-ring, and $R^4$ denotes hydrogen, an alkyl radical having 1 to 4 C atoms, an alkoxy radical having 1 to 4 C atoms or halogen, or a radical of the formula

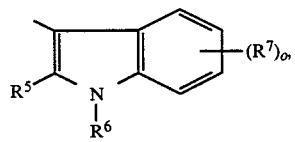

in which $R^5$ denotes an alkyl radical having 1 to 4 C atoms, a pheny radical optionally substituted by halogen, $C_1$- to $C_4$-alkyl or $C_1$- to $C_4$-alkoxy or a carbalkoxy radical having 1 to 4 C atoms, $R^6$ denotes hydrogen or an alkyl radical having 1 to 4 C atoms and which is optionally substituted by hydroxyl, halogen, alkoxy having 1 to 4 C atoms, cyano or acyloxy and $R^7$ denotes hydrogen, halogen, $C_1$- to $C_4$-alkyl, $C_1$- to $C_4$-alkoxy, carbalkoxy having 1 to 4 C atoms, $C_1$- to $C_4$-alkylsulphonyl, phenylsulphonyl, acetyl or benzoyl or a radical of the formula

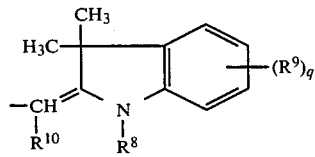

wherein $R^8$ and $R^9$ independently of one another have the same meaning as R and $R^1$, $R^{10}$ designates hydrogen or the cyano group, B represents a single bond or a $C_1$- to $C_4$-alkylene radical which is substituted by hydroxyl radicals and which is optionally substituted by one additional carboxyl group and the indices m, n, o and p independently of one another denote 1-4, by reacting a methyleneindoline compound of the formula

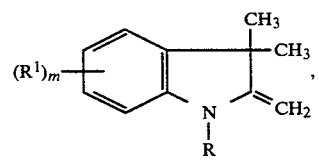

with an equimolar amount of an aldehyde of the formula

A—CHO and with 1 to 5 times the molar amount of a dicarboxylic or tricarboxylic acid of the formula

wherein B is as defined above, the improvement which comprises effecting the reaction in the substantial absence of a solvent and removing water formed in the reaction.

2. A process according to claim 1, in which the end product is of the formula

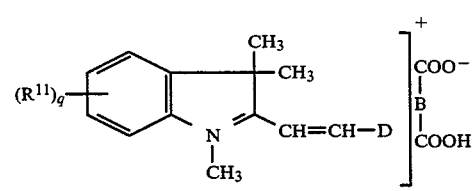

in which $R^{11}$ represents hydrogen, chlorine, methyl, methoxy, ethoxy or carbomethoxy, D represents a radical of the formula

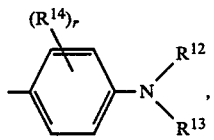

wherein
$R^{12}$ and $R^{13}$ independently of one another designate an alkyl radical having 1 to 4 C atoms and which is optionally substituted by hydroxyl, methoxy, ethoxy, chlorine, cyano, phenyl or acyloxy and
$R^{12}$ additionally designates a phenyl radical substituted by chlorine, methyl, methoxy or ethoxy and
$R^{14}$ designates hydrogen, methyl, chlorine, methoxy or ethoxy
or a radical of the formula

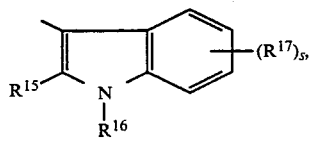

in which
$R^{15}$ denotes methyl or phenyl which is optionally substituted by chlorine, methyl or methoxy,
$R^{16}$ denotes a $C_1$- to $C_4$-alkyl radical which is optionally substituted by hydroxyl, chlorine, cyano or acyloxy or $R_{10}$ is H and
$R^{17}$ denotes hydrogen, methyl, methoxy or ethoxy or a radical of the formula

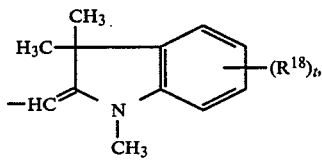

in which
$R^{18}$ independently of one another has the same meaning as $R^{11}$ and
in which
the radical B has the same meaning as in claim 1 and the indices q, r, s and t represent 1 to 2.

3. A process according to claim 2, in which the dicarboxylic or tricarboxylic acid is oxalic acid.

4. A process according to claim 1, wherein the molar ratio of aldehyde/methylene-indoline/dicarboxylic or tricarboxylic acid is 1/1/0.9 to 1.2.

5. A process according to claim 1, wherein the reaction is carried out in a reaction apparatus which is capable of uniformly mixing, and grinding into a fine powder.

6. A process according to claim 1, wherein the reaction is carried out at a temperature between 40° and 120° C.

* * * * *

UNITED STATES PATENT AND TRADEMARK OFFICE
CERTIFICATE OF CORRECTION

PATENT NO. : 4,513,142

DATED : April 23, 1985

INVENTOR(S) : Roderich Raue, et al

It is certified that error appears in the above-identified patent and that said Letters Patent is hereby corrected as shown below:

Col. 5, line 5      After "ethyl" delete "21" and substitute --2- --

Col. 5, line 17      After "(4-methoxyphenyl)-" delete "1-"

Col. 6, line 46      Delete "bath" and substitute --batch--

Col. 7, lines 2,3      Correct spelling of "polyacrylonitrile"

Signed and Sealed this

Eighth Day of October 1985

[SEAL]

Attest:

Attesting Officer

DONALD J. QUIGG

Commissioner of Patents and Trademarks—Designate